United States Patent
Al Shehri et al.

(10) Patent No.: US 11,386,541 B2
(45) Date of Patent: Jul. 12, 2022

(54) SYSTEM AND METHOD FOR CYBER-PHYSICAL INSPECTION AND MONITORING OF NONMETALLIC STRUCTURES

(71) Applicant: Saudi Arabian Oil Company, Dhahran (SA)

(72) Inventors: Ali Al Shehri, Thuwal (SA); Ahmad Aldabbagh, Thuwal (SA); Ayman Amer, Thuwal (SA); Vincent Cunningham, Thuwal (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/548,509

(22) Filed: Aug. 22, 2019

(65) Prior Publication Data
US 2021/0056678 A1 Feb. 25, 2021

(51) Int. Cl.
*G06T 7/00* (2017.01)
*G06N 20/20* (2019.01)
(Continued)

(52) U.S. Cl.
CPC .............. *G06T 7/0004* (2013.01); *G01J 5/00* (2013.01); *G06N 3/0454* (2013.01); *G06N 3/08* (2013.01);
(Continued)

(58) Field of Classification Search
CPC ......... G06T 7/0004; G06T 2207/10048; G06T 2207/20081; G06T 2207/20084;
(Continued)

(56) References Cited

U.S. PATENT DOCUMENTS 6,712,502 B2  3/2004  Zalameda et al.
7,902,524 B2  3/2011  Safai et al.
(Continued)

FOREIGN PATENT DOCUMENTS

CN       204086134       1/2015
KR  20170092997 A  *  8/2017
(Continued)

OTHER PUBLICATIONS

Dongdong Yang, et al Ensemble neural relation extraction with adaptive boosting, Apr. 2018, arXiv.org:1801.09334v2 (Year: 2018).*
(Continued)

*Primary Examiner* — Nancy Bitar
*Assistant Examiner* — Xiao Liu
(74) *Attorney, Agent, or Firm* — Leason Ellis LLP (57) ABSTRACT

A technological solution for analyzing a sequence of electromagnetic spectrum image frames of a nonmetallic asset and detecting or predicting an aberration in the asset, including a detected or predicted location of the aberration. The technological solution includes receiving the electromagnetic spectrum image frames by a pair of machine learning systems of different types, applying a machine learning algorithm to the electromagnetic spectrum image frames to stratify the electromagnetic spectrum images into abstraction levels according to an image topology and output first aberration determination information, applying a second machine learning algorithm to the electromagnetic spectrum image frames to detect patterns in electromagnetic spectrum images over time and output second aberration determination information, generating an aberration assessment based on the first and second aberration determination information, and transmitting the aberration assessment to a communicating device, including a prediction and location of an aberration in or on the nonmetallic asset.

20 Claims, 5 Drawing Sheets

(51) Int. Cl.
*G01J 5/00* (2022.01)
*G06N 3/04* (2006.01)
*G06N 3/08* (2006.01)
*G01J 5/48* (2022.01)

(52) U.S. Cl.
CPC ............... *G06N 20/20* (2019.01); *G01J 5/48* (2013.01); *G06T 2207/10048* (2013.01); *G06T 2207/20081* (2013.01); *G06T 2207/20084* (2013.01)

(58) Field of Classification Search
CPC ........ G06N 20/20; G06N 3/0454; G06N 3/08; G01J 5/00; G01J 2005/0081
See application file for complete search history.

(56) References Cited

U.S. PATENT DOCUMENTS

| | | | |
|---|---|---|---|
| 8,596,861 | B2 | 12/2013 | Kane et al. |
| 9,518,918 | B2 | 12/2016 | Mann et al. |
| 9,874,516 | B2 | 1/2018 | Mann et al. |
| 2004/0257464 | A1 | 12/2004 | Pandit et al. |
| 2007/0217672 | A1 | 9/2007 | Shannon et al. |
| 2010/0107767 | A1 | 5/2010 | Kane et al. |
| 2013/0037420 | A1 | 2/2013 | Funahashi |
| 2014/0208163 | A1 | 7/2014 | Domke et al. |
| 2015/0381948 | A1 | 12/2015 | Renkis |
| 2016/0284075 | A1* | 9/2016 | Phan .................. G06K 9/00664 |
| 2016/0343106 | A1 | 11/2016 | Hoole et al. |
| 2017/0176343 | A1 | 6/2017 | Krishnan |
| 2019/0003983 | A1* | 1/2019 | Al-Omari ............. G01N 21/95 |
| 2019/0094124 | A1* | 3/2019 | Amer ................... G06N 3/0454 |
| 2019/0096135 | A1* | 3/2019 | Dal Mutto ................ G06T 7/50 |

FOREIGN PATENT DOCUMENTS

| | | |
|---|---|---|
| WO | 2016183661 | 11/2016 |
| WO | 2017151757 | 9/2017 |

OTHER PUBLICATIONS

Napoletano, Paolo, Flavio Piccoli, and Raimondo Schettini. "Anomaly detection in nanofibrous materials by CNN-based self-similarity." Sensors 18.1 (2018): 209.

U.S. Appl. No. 16/117,937, filed Aug. 30, 2018.

Malhotra, Pankaj, et al. "Long short term memory networks for anomaly detection in time series." Proceedings. Presses universitaires de Louvain, 2015.

Donahue, Jeff, et al., "Long-term recurrent convolutional networks for visual recognition and description," 2015 IEEE Conference on Computer Vision and Pattern Recognition (CVPR), IEEE, Jun. 7, 2015, pp. 2625-2634, XP032793708.

Hassan, M. et al., "Pipeline Defect Classification by Using Non-Destructive Testing and Improved Support Vector Machine Classification," International Journal of Engineering and Innovative Technology (IJEIT), vol. 2, issue 7, p. 85-93. Jan. 2013.

"Corrosion Under Insulation and Fireproofing", American Petroleum Institute, API Recommended Practice 583, Second Edition, 2019.

International Search Report and Written Opinion in Corresponding PCT Application No. PCT/US2020/46961 dated Nov. 23, 2020. 11 pages.

* cited by examiner

SYSTEM AND METHOD FOR CYBER-PHYSICAL INSPECTION AND MONITORING OF NONMETALLIC STRUCTURES

FIELD OF THE DISCLOSURE

The present disclosure relates to a method, a system, an apparatus and a computer program for inspecting, monitoring or assessing non-metallic assets, including identifying or assessing anomalies or abnormalities in nonmetallic assets.

SUMMARY OF THE DISCLOSURE

The instant disclosure provides a cost-effective, reliable technology solution for inspecting, monitoring, assessing or predicting aberrations such as anomalies or abnormalities in nonmetallic assets. More specifically, the disclosure provides a method, a system, an apparatus and a computer program for inspecting, monitoring, assessing or predicting aberrations in non-metallic assets.

According to one non-limiting embodiment of the disclosure, a computer-implemented method is provided for analyzing a sequence of electromagnetic spectrum image frames of a nonmetallic asset and detecting or predicting an aberration in the asset, including a detected or predicted location of the aberration. The method comprises receiving the electromagnetic spectrum image frames by a pair of machine learning systems of different types, applying a machine learning algorithm to the electromagnetic spectrum image frames to stratify the electromagnetic spectrum images into abstraction levels according to an image topology and output first aberration determination information, applying a second machine learning algorithm to the electromagnetic spectrum image frames to detect patterns in electromagnetic spectrum images over time and output second aberration determination information, generating an aberration assessment based on the first and second aberration determination information, and transmitting the aberration assessment to a communicating device, wherein the aberration assessment includes prediction of an aberration and a location of the aberration in or on the nonmetallic asset. The method can further comprise receiving gas profile data indicative of an gas emitted from or by the asset.

According to a further non-limiting embodiment of the disclosure, an inspection and monitoring system is provided for analyzing a sequence of electromagnetic spectrum image frames of a nonmetallic asset and detecting or predicting an aberration in the asset, including a detected or predicted location of the aberration. The system comprises a first machine learning system configured to receive the electromagnetic spectrum image frames and apply a convolutional machine learning algorithm to the electromagnetic spectrum image frames to stratify the electromagnetic spectrum image frames into abstraction levels according to an image topology and output first aberration determination information, a second machine learning system configured to apply a recurrent machine learning algorithm to the electromagnetic spectrum image frames to detect patterns in electromagnetic spectrum images over time and output second aberration determination information, and an inspection and monitoring unit configured to generate an aberration assessment based on the first and second aberration determination information and transmit the aberration assessment to a communicating device, wherein the first machine learning system is different from the second machine learning system.

According to a still further non-limiting embodiment of the disclosure, a non-transitory computer readable storage medium is provided that contains inspection and monitoring program instructions for causing a computing device to analyze a sequence of electromagnetic spectrum image frames of a nonmetallic asset and detect or predict an aberration in the asset, including a detected or predicted location of the aberration. The program instructions comprise the steps of receiving the electromagnetic spectrum image frames by a pair of machine learning systems of different types, applying a machine learning algorithm to the electromagnetic spectrum image frames to stratify the electromagnetic spectrum images into abstraction levels according to an image topology and output first aberration determination information, applying a second machine learning algorithm to the electromagnetic spectrum image frames to detect patterns in electromagnetic spectrum images over time and output second aberration determination information, generating an aberration assessment based on the first and second aberration determination information, and transmitting the aberration assessment to a communicating device, wherein the aberration assessment includes prediction of an aberration and a location of the aberration in or on the nonmetallic asset. The program instructions can further comprise the step of analyzing gas profile data indicative of a gas emitted from or by the asset.

In the various non-limiting embodiments of the disclosure: the electromagnetic spectrum image frames can comprise thermographs; the pair of machine learning systems of different types can include a convolutional neural network (CNN) and a recurrent neural network (RNN); the pair of machine learning systems of different types can include a convolutional neural network (CNN) and an ensemble neural network (ENN); the ensemble neural network (ENN) can comprise a recurrent neural network (RNN) combined with an adaptive boosting algorithm; the adaptive boosting algorithm can comprise AdaBoost; the first aberration determination information can be output from a first one of the pair of machine learning system to an input of the other of the pair of machine learning systems; the convolutional neural network can include a plurality of hierarchical layers, each hierarchical layer including a convolutional stage, a nonlinear function stage and a pooling stage; the aberration assessment can comprise an augmented reality image of the aberration superimposed with a visible image of the nonmetallic asset; the visible image can include red, blue, and green signal components; or the aberration assessment can comprise an image of the aberration with an image of the nonmetallic asset.

Additional features, advantages, and embodiments of the disclosure may be set forth or apparent from consideration of the detailed description and drawings. Moreover, it is to be understood that the foregoing summary of the disclosure and the following detailed description and drawings provide non-limiting examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced.

The present disclosure is further described in the detailed description that follows.

DETAILED DESCRIPTION OF THE DISCLOSURE

The disclosure and its various features and advantageous details are explained more fully with reference to the non-limiting embodiments and examples that are described or illustrated in the accompanying drawings and detailed in the following description. It should be noted that features illustrated in the drawings are not necessarily drawn to scale, and features of one embodiment may be employed with other embodiments as those skilled in the art would recognize, even if not explicitly stated. Descriptions of well-known components and processing techniques may be omitted so as to not unnecessarily obscure the embodiments of the disclosure. The examples are intended merely to facilitate an understanding of ways in which the disclosure may be practiced and to further enable those skilled in the art to practice the embodiments of the disclosure. Accordingly, the examples and embodiments should not be construed as limiting the scope of the disclosure. Moreover, it is noted that like reference numerals represent similar parts throughout the several views of the drawings.

Metallic assets such as pipes, pipelines, tanks, and vessels, among other things, are commonly used in many industries like construction, manufacturing, petroleum and transportation. Because corrosion of metal assets can be a serious and costly problem to remediate, there has been a significant push in such industries to replace metallic assets with nonmetallic alternatives that are resistant to corrosion, thereby cutting corrosion-related costs and increasing revenues. However, the industries have been resistant to such replacements due to the lack of a cost-effective inspection or failure detection technology that can reliably identify and localize aberrations in nonmetallic assets, including failures and mechanical deformations, such as, for example, surface microcracks, propagation of failure, factures, liquid or gas leaks at the joints, among many others. There exists a great unfulfilled need for a cost-effective and reliable technology solution for inspecting, monitoring, assessing or predicting aberrations in nonmetallic assets.

According to principles of the disclosure, a cost-effective and reliable technology solution is provided that can inspect, monitor, assess or predict nonmetallic assets and accurately detect, identify and localize aberrations in nonmetallic assets. The technology solution includes a non-contact, non-intrusive cyber-physical system that combines imaging and machine learning to detect, identify, and localize aberrations in nonmetallic assets while the assets remain operational. Infrared (IR) imagery combined with machine learning can be very effecting in detecting temperature-dependent failures such as, for example, leaks or gases, surface cracks, subsurface cracks, among other things; and, visible RGB (red, green, blue) imagery combined with machine learning can be effective in detecting, for example, fracture propagation or cracks.

The technology solution can include a cyber-physical (CP) asset inspector that can receive image data comprising sequences of image frames of an asset under inspection, and that can detect, classify, and predict aberrations in the asset, without contacting or interfering with the operation of the asset. The CP asset inspector includes a machine learning system. Machine learning based on images is a very challenging task. It relies on features to compare imagery and associate one to another or to a specific label. Some considerations should be taken during data acquisition from real operating assets. The type and resolution characteristics of the imaging device are important since an algorithm can infer elements (cracks, leaks, detachment, mechanical deformation, etc.) directly from image pixels. Also, neural networks filter information across multiple layers as a function of time or augmentation characteristics, therefore the time gradient (recording video and sequence of frames) is an important element in the overall analysis to a machine learning classifier.

The CP asset inspector can include one or more feedforward or feedback neural networks. The CP asset inspector can include a machine learning system such as a convolutional neural network (CNN) for pattern recognition and aberration identification, and another machine learning system such as a recurrent neural network (RNN) for pattern detection, identification and prediction in sequences of image frames of an asset. The CNN can include a deep convolutional neural network (DCNN). The RNN can include a long short-term memory (LSTM) neural network or a gated recurrent unit (GRU) neural network. The RNN can include a plurality of stacked RNNs. The RNN can include gating units with the RNN to address decay of information over time, such as, for example, gradient clipping, steeper gates, or better optimizers.

In a non-limiting embodiment of the disclosure, the CP asset inspector can include an adaptive boosting (e.g., AdaBoost, tensorflow) algorithm that can work in conjunction with the RNN (or CNN) to improve performance. For instance, the CP asset inspector can include a hybrid machine learning system that combines the adaptive boosting algorithm with a Long Short-Term Memory (LSTM) neural network to provide an ensemble neural network. The adaptive boosting algorithm can train a database to provide training samples, the LSTM can predict each training sample separately, and the adaptive boosting algorithm can than integrate the predicted training samples to generate aggregated prediction results for predicting an aberration in an asset under inspection. The adaptive boosting algorithm can be combined with one or more weak learning algorithms, such as, for example, decision trees, for enhanced performance.

The technology solution can further include a cyber-physical (CP) ambiance inspector that can detect, classify, assess and predict ambient conditions that can surround an asset under inspection based on analysis of, for example, electromagnetic spectrum data or gas sensor data. The CP ambiance inspector can be configured similar to the CP asset inspector. For instance, the CP ambiance inspector can include a CNN and an RNN, and, optionally, it can further include an adaptive boosting algorithm that can work in conjunction with the CNN or RNN for improved performance, at the cost of increased computing time. The CNN can provide pattern recognition and aberration identification, and the RNN can provide pattern detection, identification and prediction in sequences of image or sensor data frames of the asset and surrounding area. The CP ambiance inspector can receive electromagnetic spectrum image frames (or gas sensor data) of the asset and surrounding area and detect, identify and predict ambient conditions surrounding the asset, including conditions such as gas leaks or emissions from or by the asset. The electromagnetic spectrum image frames can include image data from, for example, a hyperspectral camera, an infrared (IR) camera, a forward-looking IR (FLIR) camera, or any other image pickup device that can capture images of one or more types of gases that might be emitted by or from the asset under inspection.

In one advantageous embodiment, the CNN is used in the CP asset inspector (or CP ambiance inspector) to hierarchically classify captured thermograph data. This is followed by processing the thermograph data captured over a duration of time using the RNN. In some implementations, a bosting algorithm can be included and used in conjunction with the CNN or RNN in order to achieve higher accuracies. While the boosting algorithm increases the overall number of computations by the CP asset inspector, and thus increases computational time, the resultant additional accuracy can be a more significant factor where misidentification is costly.

The technology solution can provide rapid analysis, detection and prediction of aberrations in an asset, including outer surfaces, inner surfaces, and the structure of the asset. The technology solution can provide analysis, detection, and prediction of aberrations and their locations in the asset. The technology solution includes an "intelligent system" that includes machine learning and deep learning (subset of machine learning) to make determinations or predictions based on the solution's ability to learn from historical data and accurately predict aberrations that can occur or develop over time in the asset. The solution can fit historical data to different models using machine learning such as the CNN and RNN, and, optionally, ensemble learning methods such as adaptive boosting (e.g., Adaboost), decision trees, support vector machines (SVMs), or any other supervised (or unsupervised) learning algorithm. Both supervised and unsupervised learning can be applied in the technology solution. Supervised learning can be applied by training, and unsupervised learning can be, for example, applied using autoencoding methods which are known to those skilled in the art.

The CNN can stratify input images into abstraction levels according to an image topology, and the RNN can detect patterns in the images over time. By combining both the CNN and the RNN, the solution can accomplish both tasks to, not only detect areas of interest and aberrations, but also capture the creation and development of the areas of interest and aberrations over time.

The CNN can be used in the context of the technology solution to receive as input a sequence of electromagnetic spectrum images (ESIs) of a localized section of a nonmetallic asset. The ESI frames can include thermographic image frames of the localized section of the asset. The CNN can include multiple hierarchical levels. The initial hierarchical level can include a plurality of parallel processing paths, each processing path in turn can include multiple distinct processing stages. This complex scheme can be clarified by explanation of the stages of a single processing path at a single level. For instance, in the initial hierarchical level, a first convolutional stage can apply a first convolution function (filter) to the input ESI data. It is noted that the other processing paths can operate on another localized section of the input ESIs. Each hierarchical level can apply a different convolution function to the data it receives to better identify features in the images. The filters can, for example, blur contrasts between neighboring image values by averaging, or, conversely, some filters can enhance differences to clarify edges. Each filter composes a local patch of lower-level features into higher-level representation. In this manner, edges can be discerned from pixels, shapes can be discerned from edges, and so on. In a non-limiting example, a convolution matrix (or "window") can be applied to a 5×5 square sample of pixel values by sliding the convolution matrix over the values of the sample values. In this example, the convolution matrix can be a 3×3 matrix function that multiplies all values along the diagonals by one and values not along the diagonals by zero. The sum of each 3×3 section of the image sample as acted upon by the convolution matrix can be provided to an output matrix. The output matrix can then be fed as output to the next stage of the hierarchical layer.

The next stage hierarchical layer in the CNN can apply a non-linear function to the data of the convolutional stage, such as a ReLU (rectified linear unit) or a tanh function. This stage can be represented as $y_{i,j} = f(a_{i,j})$, where $f$ represents the non-linear function and $a_{i,j}$ represents a pixel of the $i^{th}$ row and $j^{th}$ column from the output matrix of the convolution stage. The output of the non-linear function stage can thus be a modified version of the matrix output from convolutional stage. The final stage of hierarchical level can be a pooling stage that can be used to simplify the data. For example, the pooling stage can apply a maximum function to output only the maximum value of the non-linear function of the number of rows and columns of pixels of the output matrix from the non-linear stage. After simplifying the data, the outputs of the pooling stages of all three processing paths can be summed and then input to the convolution stage of one of the processing paths of the next hierarchical layer. In the hierarchical layer, similar or different convolution matrices can be used to process the data received from the first hierarchical layer, and the same or different non-linear functions and simplification functions can be used in the following non-linear stage and pooling stage. Outputs from the parallel processing paths of the second hierarchical layer can be similarly pooled and then provided as an output matrix to the third hierarchical layer, in which further processing takes place. The final output can be interpreted as a class label probability, or put another way, the most likely classification for the image. Classifications can include different types of hot spots indicative of temperature differentials and possible aberrations.

The CNN can learn by validation and backward propagation. This can be equivalent to setting values of the output and then running the algorithm backwards from the higher hierarchical layers to the lower layers and modifying the convolution matrices to yield better results using an optimization function. After training, the CNN is able to accurately classify an input ESI (including thermograph image) into one of a number of preset categories, such as, for example, a hot spot, a non-hot spot or any gradation between hot spot and non-hot spot.

While the CNN is efficient and useful for stratifying input ESIs into abstraction levels according to the ESI (e.g., thermograph image) topology, it may not be best suited for detecting patterns over time. Embodiments of the present invention therefore employ the RNN in conjunction with the CNN to improve time-based pattern recognition and aberration prediction.

The RNN can have any number of layers. In a non-limiting example, the RNN includes three layers, of which the second layer can receive $x_t$ as an input to the layer at time t. The input $x_t$ can be a vector or matrix of values. In a hidden state of the RNN, at time t the state can be considered as the "memory" of the RNN. The hidden state can be calculated based on the previous hidden state and the input at the current step: $s_t = f(Ux_t + Ws_t - 1)$. The function $f$ can be a nonlinear function such as tanh or ReLU. The first hidden state can be initialized to all zeroes. $S_t$ can be modified by a parameter vector V to yield $O_t$, which is the output at time t. $O_t$ can be interpreted as a matrix or vector of probabilities for the next state s+1. The RNN can share the same parameters (U, V, W above) across all steps. This reflects the fact that the same task at each step is performed at each step but with different inputs. This reduces the total number of parameters to learn, and thus also reduces processing time. While in this example each layer has outputs at each time step, this is not necessary as in some implementation only the final output may be of interest.

The RNN can be used in the technology solution to detect changes to ESIs (including thermographs) over time, and to account for environmental variables. These variables can be introduced as parameters into the RNN along with ESI data. Important variables to consider can include ambient conditions, conditions of the nonmetallic asset, conditions of any aberrations identified and configuration of the field transducer (FT) device used for ESI capture with respect to the asset. For example, ambient conditions to account for in the analysis can include, without limitation, the weather conditions (e.g., temperature, pressure, humidity, precipitation, radiation exposure (e.g., due to the Sun), or wind) over time, fluid conditions (e.g., temperature, pressure, velocity) within the structure over time, dust, and the time of year in the location. The conditions of the structure can include, without limitation, the dimensions of the asset, the asset type and physical properties, arrangements of joints, elbows, deadlegs, and optical characteristics of the exposed surface, reflectivity of the asset surfaces, and any visible aberrations. The conditions of any aberration identified can include, without limitation, the location, shape, size, depth, and direction. A factor of the configuration of the FT device can include the distance between the FT device and the asset, the position of the FT device with respect to the asset, the field of view, and any other factors that can impact the quality of the ESI captured of the asset by the FT device.

Using information related to the tendency of the various ESIs (e.g., thermographs) and conditions to vary over time, further levels of analysis can be conducted. For example, an analysis can focus on: how the temperature difference data (e.g., hot spots, aberrations) at various locations on the asset are related or distinguishable; an overall tendency of the temperature and aberrations over time; whether features that change over time appear, disappear or degrade; whether effects are more probably due to extraneous emissivity and reflections rather than aberration.

In some embodiments, the boosting algorithm, such as Adaboost, can be used in conjunction with the CNN or RNN to achieve higher accuracies at the expense of additional computation. Boosting can be used for combining and improving "weak learners," which are machine learning algorithms that, even after training, have a high error rate identification, into a "strong" learner. Adaboost combines the output of the weak learning algorithms into a weighted sum that represents the final output of the boosted classifier. The weight of any given algorithm is based on the accuracy of that algorithm. While CNNs and RNNs can generally be trained to be strong learners, it can be advantageous to add boosting to further ensure accuracy because mistakes can be extremely costly. Increasing accuracy at the sacrifice of computational time can be an acceptable trade-off. In addition, boosting can be useful in the designing phase for testing the CNN or the RNN.

Figure 1:
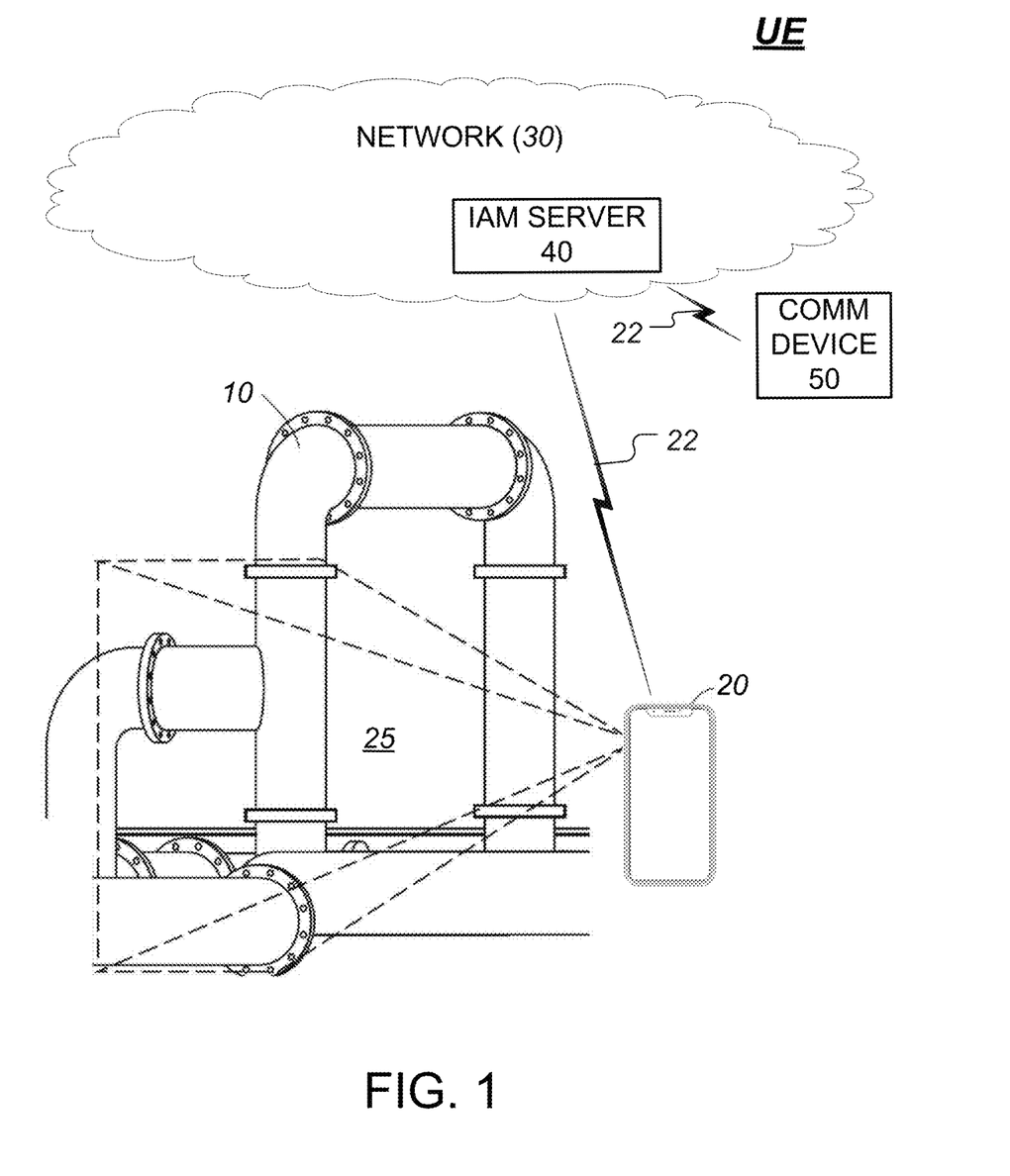
FIG. 1 shows an example of a user environment (UE) provided with a non-limiting embodiment of an inspection and monitoring (IAM) system, configured according to the principles of the disclosure.

FIG. 1 shows a user environment (UE) provided with a non-limiting embodiment of an inspection and monitoring (IAM) system, configured according to the principles of the disclosure. The user environment UE can include a nonmetallic asset 10 or a network of nonmetallic assets located in a small geographic area (e.g., a petroleum refinery) or spread over a large geographic area (e.g., a nonmetallic pipeline that spans over different regions or countries). The IAM system can include an inspection and monitoring (IAM) server 40. The IAM server 40 can include a single server or a network of two or more servers. The IAM server 40 can include a display device (not shown). The IAM server 40 can be located in a network 30. The network 30 can include a private network, an enterprise network, or a public network. The IAM server 40 can exchange data and control signals with a field transducer (FT) device 20 via a communication link 22.

The FT device 20 can include a communicating device, such as, for example, a cellular telephone, a smartphone, a digital video camera, a digital single lens reflex (SLR) camera, a hyperspectral camera, an IR camera, a FLIR camera, or a software defined camera that can be configured to capture image signals in various bands of the electromagnetic spectrum, including the IR band. The FT device 20 can include a smartphone equipped with an IR, FLIR, thermographic or software defined camera that can capture image signals in various bands of the electromagnetic spectrum, including the IR band. The FT device 20 can include an off-the-shelf (OTS) digital camera or smartphone with a high-resolution camera (e.g., 8 megapixel or higher) that can capture image data over a broad spectral range, including, for example, 1 mm to 10 nm wavelengths. In a non-limiting embodiment, the FT device 20 can capture image signals having wavelengths from about 700 nm to about 14,000 nm.

The IAM system can further include a communicating device 50, which can include a display device (not shown). The communicating device 50 can exchange data and instruction signals with the IAM server 40 via a communication link 22. The communicating device 50 can exchange data and instruction signals with the FT device 20 via a communication link 22. The communicating device 50 can be located in the user environment UE, or elsewhere, such as, for example, in the network 30. The communicating device 50 can be located at, for example, an analyst location, a field repair dispatcher location or a location of a user tasked with inspecting, monitoring, assessing or remediating aberrations that are detected or predicted in assets 10 by means of the IAM server 40.

The IAM server 40 can receive and analyze ESI data or gas sensor data and detect, identify, assess or predict an aberration and its location in the asset 10. The IAM server 40 can analyze sequences of ESI frames (e.g., IR or FLIR image frames) of a section or the entire asset 10 captured by the FT device 20 over a period of time, which can range anywhere from a few seconds to hours, days, weeks, months, or years, depending on the application. The ESI frame data can be received by the IAM server 40 directly from the FT device 20 (e.g., via communication link 22) or retrieved from a database 175 (shown in FIG. 5). Based on the ESI data analysis, the IAM server 40 can inspect and monitor the nonmetallic asset 10 and detect, identify or predict an aberration and its location where it exists or might develop over time in the asset 10. The IAM server 40 can be configured to receive the ESI frame data from one or more FT devices 20 in real-time. The IAM server 40 can combine the received ESI frame data and machine learning to identify and localize aberrations in the nonmetallic asset 10 while the asset remains fully operational. The IAM server 40 can analyze gas sensor data and detect, classify, assess or predict gaseous conditions that might surround the asset 10, as well as the location(s) where a gas might be emitted from or by the asset. The gas sensor data can be analyzed to detect or predict, for example, a gas leaking from, or that might leak from the asset 10 over time.

The FT device 20 can include a radiant energy sensor (not shown) that can detect and capture ESI signals in a field of view 25 of the FT device 20. The radiant energy sensor can include, for example, one or more charge-coupled device (CCD) arrays. The ESI signals can include image signals having wavelengths or frequencies in the electromagnetic spectrum. The image signals can have wavelengths anywhere from, for example, $10^{-12}$ meters (gamma rays) to $10^3$ meters (radio waves), depending on the application of the technology solution. Relatedly, the image signals can have frequencies ranging anywhere from, for example, $10^4$ Hz (radio waves) to $10^{20}$ Hz (gamma rays). According to an embodiment of the disclosure, the radiant energy sensor (not shown) in the FT device 20 can be constructed or configured to capture image signals in the IR or near-IR band of the electromagnetic spectrum, including wavelengths in the range of about 700 nm to about 1 mm, or frequencies in the range of about 300 GHz to about 430 THz. The FT device 20 can include a thermographic (or IR) camera.

The FT device 20 can include a gas sensor (not shown) that can detect, measure or monitor one or more types of gases. The radiant energy sensor (not shown) can function as the gas sensor in applications where a sequence of images of a gas can be captured by the radiant energy sensor and the images analyzed to detect or predict the gas. The gas sensor can include, for example, an electrochemical sensor, a catalytic bead sensor, an IR camera, an FLIR camera, a hyperspectral camera, or any other sensor device that can detect a variety of different gases that might be contained in the asset 10. The gas sensor can include one or more spectral or hyperspectral sensors, each one configured to collect image data in a narrow spectral band, including image data relating to transmittance, absorption or reflectance of electromagnetic energy by gas molecules. An additional machine learning system (e.g., CNN or RNN or ENN) or an additional layer in the CNN or RNN can be applied to distinguish between different gases and classify the gasses according to type of gas, concentration, flow vector (including, e.g., direction of flow, velocity, magnitude, and changes in flow direction, velocity or magnitude as function of time).

An FT device 20 equipped with a hyperspectral camera can use the camera as both the radiant energy sensor and the gas sensor by capturing images in different regions of the electromagnetic spectrum.

In addition to ESI data, the FT device 20 can store additional data relating to the asset 10 under inspection to account for environmental variables. The additional data can be captured by the FT device 20 or received from a user via an interface device (not shown) or uploaded/downloaded from a computing device (not shown) to the FT device 20 via, for example, a Universal Serial Bus (USB). The additional data can include, for example, ambient conditions, conditions of the nonmetallic asset, asset type, material(s) contained in the asset, conditions of any aberrations identified, and configuration of the field transducer (FT) device used for ESI capture with respect to the asset. Ambient conditions can include, without limitation, the weather conditions (e.g., temperature, pressure, humidity, precipitation, radiation exposure (e.g., due to the Sun), or wind) over time, fluid conditions (e.g., temperature, pressure, velocity) within the structure over time, dust, and the time of year in the location. The conditions of the structure can include, without limitation, the dimensions of the asset, the asset type and physical properties, arrangements of joints, elbows, deadlegs, and optical characteristics of the exposed surface, reflectivity of the asset surfaces, and any visible aberrations. The conditions of any aberration identified can include, without limitation, the location, shape, size, depth, and direction. A factor of the configuration of the FT device can include the distance between the FT device and the asset, the position of the FT device with respect to the asset, the field of view, and any other factors that can impact the quality of the ESI captured of the asset by the FT device.

The IAM system in the user environment UE provides a number of significant advantages compared to known inspection technologies. For instance, the IAM system provides noncontact nondestructive inspection and monitoring, noncontact remote sensing, nondestructive sensing, internal/external asset inspection and monitoring, and inspection and monitoring of operating assets. Additionally, the IAM system can be used with images of assets 10 captured by OTS smartphone cameras.

Figure 2:
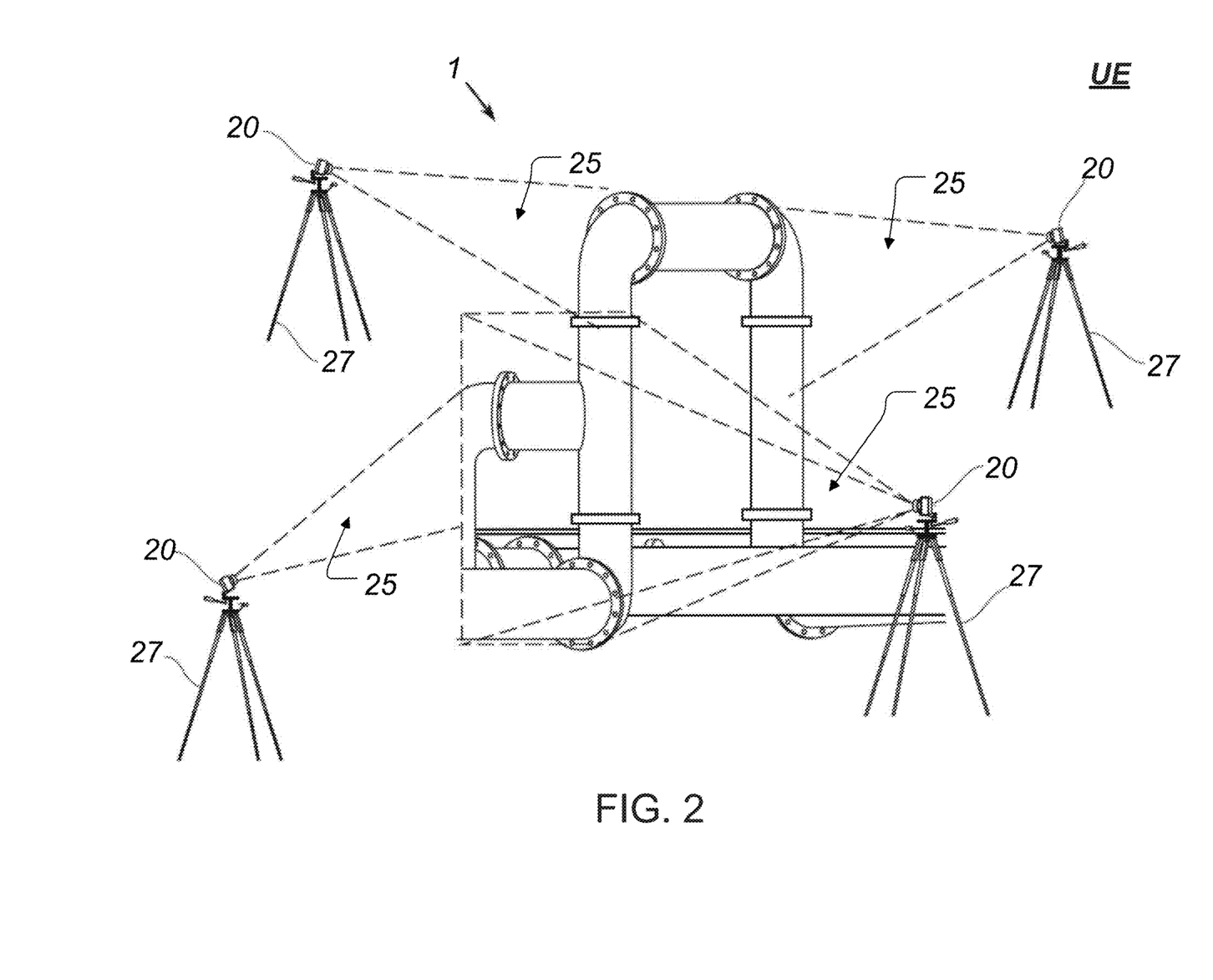
FIG. 2 shows the user environment UE in FIG. 1 provided with a plurality of field transducer devices.

FIG. 2 shows the user environment UE provided with a plurality of FT devices 20, each of which can be positioned to capture ESIs of a different or overlapping section of the nonmetallic asset 10. Any one or more of the FT devices 20 can be attached to a support 27 and positioned to inspect and monitor a specific section of the asset 10 over a predetermined period of time, which can range from milliseconds, to seconds, to minutes, to hours, or longer, depending on the asset type, its characteristics, the operating conditions, or the user environment UE. Each FT device 20 can communicate with the IAM system via a communication link 22.

Figure 3:
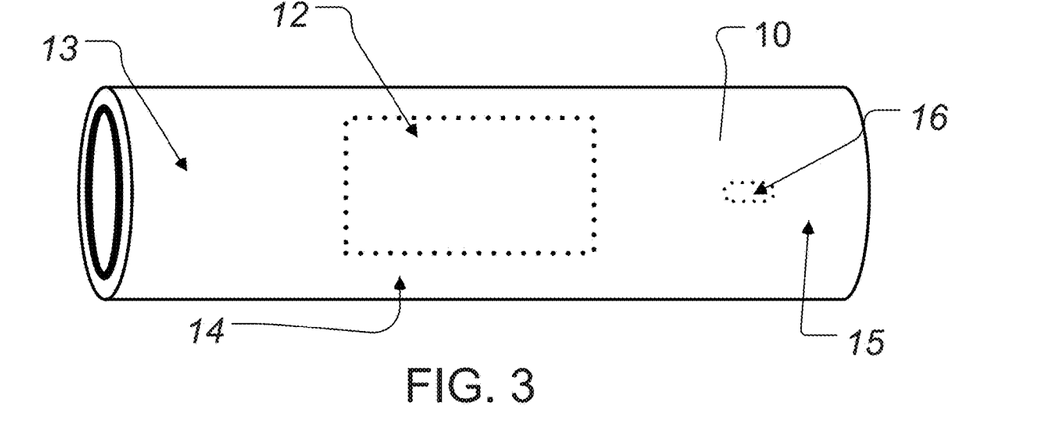
FIG. 3 shows an example of a depiction of a section of a nonmetallic asset in FIG. 1 imaged by a field transducer device.

FIG. 3 shows an example of a depiction of a section of the nonmetallic asset 10 imaged by the FT device 20. The nonmetallic asset section can include portions 12 and 16, each of which includes an aberration. According to the non-limiting example seen in FIG. 3, the nonmetallic asset 10 includes a section of a 6-foot-diameter RTR pipe (Reinforced Thermosetting Resin pipe) having three separate zones 13, 14, 15. The zone 13 can be a normal untouched inner surface of the pipe 10 without any aberrations. The zone 14 can include a portion 12 that has an aberration created by reducing the thickness of the pipe wall in the marked area by about 50%. For illustrative purposes, the aberration in this example can be the entire portion 12. The zone 15 can include a minor aberration 16 that is predicted to develop over time, such as, for example, less than 10% thickness loss of pipe wall diameter.

Figure 4:
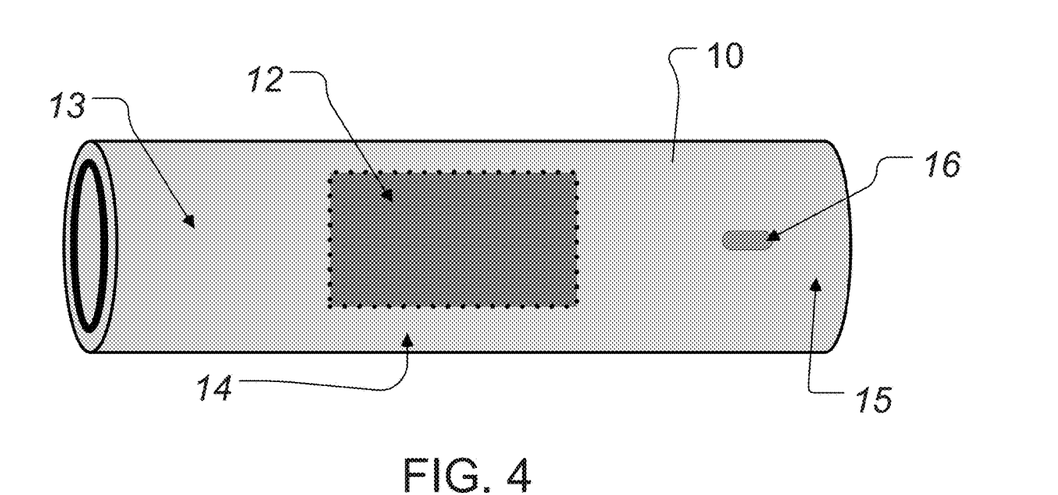
FIG. 4 shows an illustrative depiction where electromagnetic spectrum data comprises a sequence of infrared images of the section of nonmetallic asset in FIG. 3.

FIG. 4 shows an illustrative depiction where the ESI data comprises a sequence of FLIR images of the section of nonmetallic asset 10 in FIG. 3 captured by the FT device 20 (shown in FIG. 1). As seen in FIG. 4, the FLIR image can contain a heat map or thermal gradient map of the RTR pipe with the portion 12, which can be presented with the superimposed prediction profile for the aberration in portion 16 in the output of the AIA apparatus 100 (discussed below). For instance, the aberration 16 can be predicted by the AIA apparatus 100 to develop in zone 15 over time, and its image can be combined with the image of the asset 10, including portion 12, output by the apparatus for display. A sequence of image frames of the RTR pipe 10 can be captured by positioning the FT device 20 proximate to the pipe at a distance of no greater than, for example, 1 meter and allowing the device to capture the thermal signature for about 10 to 30 minutes, where the exposure time can be shortened or lengthened to optimize image capture.

The ESI (e.g., thermal) images of the portion 12 and aberration 16 can be noticeably different than that of the rest of the asset 10, as depicted in the example in FIG. 4. In this non-limiting example, the portion 12 is observed to have a substantially uniform image signal intensity and distribution across its entire area, indicating that the aberration is uniform and evenly distributed across the entire area of the portion 12. The portion 16 can be predicted to develop an aberration over time.

In addition to the captured FLIR image, the FT device 20 can capture an image of a gas profile that might exist for a gas proximate to or surrounding the outer surface of the asset 10, such as, for example, where a gas (e.g., methane, propane, butane, ethane, hydrogen sulfide, chlorine) leaks out from a crack or hole in the asset 10 during operation, or where the gas is emitted by the asset 10 as a result of a chemical reaction occurring in the structure of the asset 10. The FT device 20 can detect, measure or monitor the gas. Where the FT device 20 comprises an OTS smartphone equipped with a high-resolution camera, the FT device 20 can be configured to capture an image of the gas profile by, for example, setting the sensor for optimal infrared hyperspectral imaging to allow the radiant energy sensor to capture instances of IR absorption or emission profiles of different gases. The output of the FT device 20 can include a heat or hyperspectral map of the asset, this image data can be sent to the AIA apparatus 100 (shown in FIG. 5), where it can be stored and used by a previously trained machine learning framework in the apparatus. The output of the AIA apparatus 100 can include an image containing the original heat or hyperspectral map of the asset with a prediction profile for the aberration.

Figure 5:
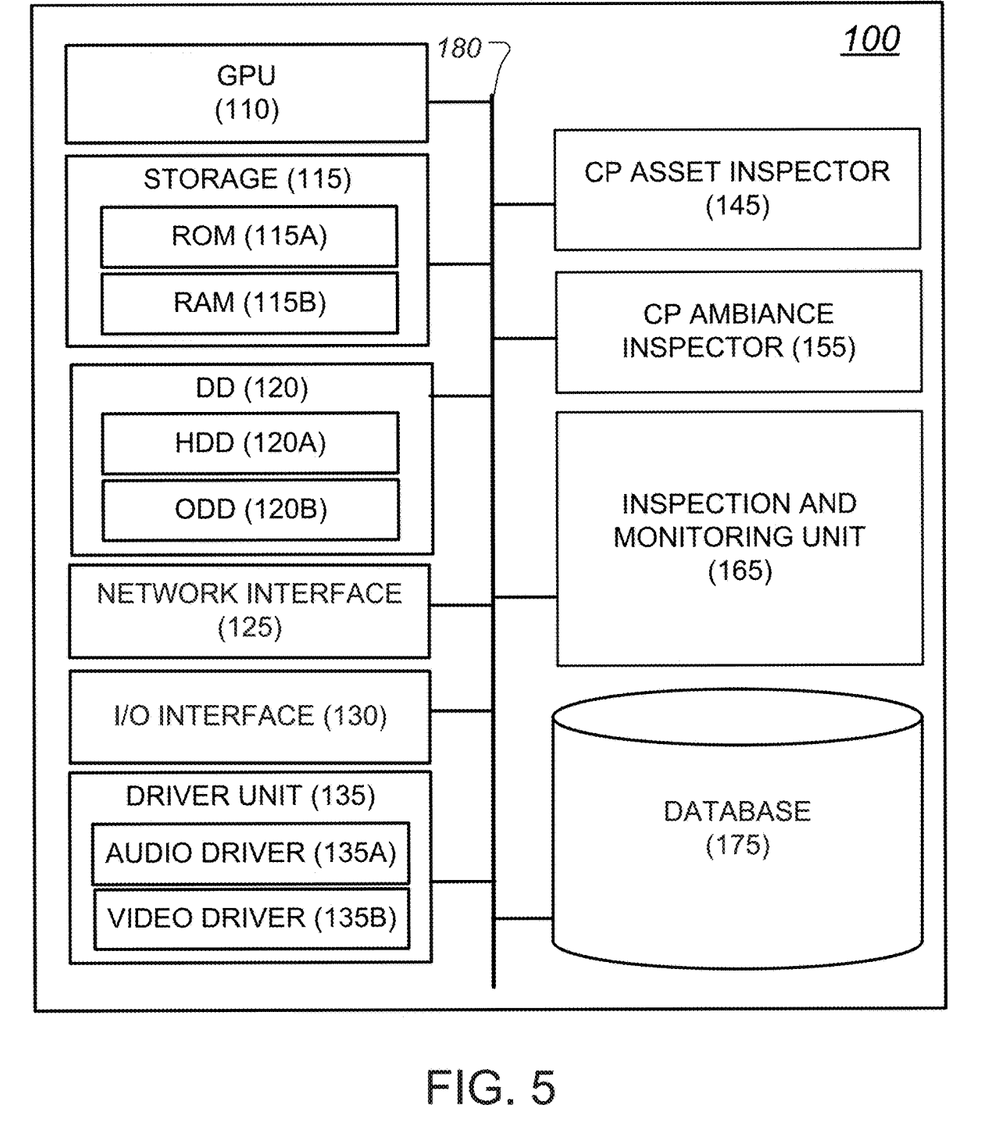
FIG. 5 shows an example of an aberration inspection and assessment (AIA) apparatus, according to the principles of the disclosure.

FIG. 5 shows a non-limiting embodiment of an aberration inspection and assessment (AIA) apparatus 100, according to the principles of the disclosure. The AIA apparatus 100 can be included in the JAM server 40 (shown in FIG. 1). The AIA apparatus 100 can be configured to implement the various aspects of the disclosure. The AIA apparatus 100 can include a graphic processing unit (GPU) 110, a storage 115, a disk drive (DD) 120, a network interface 125, an input/output (I/O) interface 130, and a driver unit 135. The AIA apparatus 100 includes a cyber-physical (CP) asset inspector 145. The AIA apparatus 100 can include a cyber-physical (CP) ambiance inspector 155 and/or an image and monitoring (JAM) unit 165. The AIA apparatus 100 can include a database 175 and a system bus 180. The system bus 180 can be communicatively linked to each of the components 110 to 175 in the AIA apparatus 100 by a communication link. Any one or more of the components 115 to 175 can include a device or a module that is separate from the GPU 110, as seen in FIG. 5, or integrated or integrateable in a device(s) such as, for example, the GPU 110. The AIA apparatus 100 can include a sound generation device (not shown), such as, for example, a speaker, or a display device (not shown).

The system bus 180 can include any of several types of bus structures that can further interconnect to a memory bus (with or without a memory controller), a peripheral bus, and a local bus using any of a variety of commercially available bus architectures. The system bus 180 can include a backbone.

The GPU 110 can include any of various commercially available graphic processing unit devices. Dual microprocessors and other multi-processor architectures can be included in the GPU 110. The GPU 110 can include a central processing unit (CPU).

The AIA apparatus 100 can include a computer-readable medium that can hold executable or interpretable computer code (or instructions) that, when executed by the GPU 110 or CP asset inspector 145 (or CP ambiance inspector 155 or IAM unit 165), causes the steps, processes and methods in this disclosure to be carried out. The computer-readable medium can be provided in the storage 115 or DD 120. The computer readable medium can include sections of computer code that, when executed cause the AIA apparatus 100 to carry out an aberration inspection and assessment (AIA) process 200 shown in FIG. 6, as well as all other process steps described or contemplated in this disclosure.

The storage 115 can include a read only memory (ROM) 115A and a random-access memory (RAM) 115B. A basic input/output system (BIOS) can be stored in the non-volatile memory 115A, which can include, for example, a ROM, an EPROM, or an EEPROM. The BIOS can contain the basic routines that help to transfer information between components within the AIA apparatus 100, such as during start-up. The RAM 115B can include a high-speed RAM such as static RAM for caching data.

The DD 120 can include a hard disk drive (HDD) 120A and an optical disk drive (ODD) 120B. The HDD 120A can include, for example, an enhanced integrated drive electronics (EIDE) drive, a serial advanced technology attachments (SATA) drive, or the like; and, the ODD 120B can include, for example, a read/write from/to a CD-ROM disk (not shown), or, read from or write to other high capacity optical media such as a digital versatile disc (DVD). The HDD 120A can be configured for external use in a suitable chassis (not shown). The DD 120 can be connected to the system bus 180 by a hard disk drive interface (not shown) and an optical drive interface (not shown), respectively. The hard disk drive interface (not shown) can include a Universal Serial Bus (USB) (not shown), an IEEE 1394 interface (not shown), and the like, for external applications.

The storage 115 or DD 120, including computer-readable media, can provide nonvolatile storage of data, data structures, and computer-executable instructions. The storage 115 or DD 120 can accommodate the storage of any data in a suitable digital format. The storage 115 or DD 120 can include one or more apps that are used to execute aspects of the architecture described herein.

One or more program modules can be stored in the storage 115 or DD 120, including an operating system (not shown), one or more application programs (not shown), other program modules (not shown), and program data (not shown). Any (or all) of the operating system, application programs, program modules, and program data can be cached in the RAM 115B as executable sections of computer code.

The network interface 125 can be connected to the network 30 (shown in FIG. 1). The network interface 125 can include a wired or a wireless communication network interface (not shown) or a modem (not shown). When used in a local area network (LAN), the AIA apparatus 100 can be connected to the LAN network through the wired or wireless communication network interface; and, when used in a wide area network (WAN), the AIA apparatus 100 can be connected to the WAN network through the modem. The network 30 (shown in FIG. 1) can include a LAN, a WAN, the Internet, or any other network. The modem (not shown) can be internal or external and wired or wireless. The modem can be connected to the system bus 180 via, for example, a serial port interface (not shown).

The (I/O) interface 130 can receive commands and data from an operator. The I/O interface 130 can be communicatively coupled to one or more input/output devices (not shown), including, for example, a keyboard (not shown), a mouse (not shown), a pointer (not shown), a microphone (not shown), a speaker (not shown), or a display (not shown). The received commands and data can be forwarded from the I/O interface 130 as instruction and data signals via the bus 180 to any component in the AIA apparatus 100, including, for example, the GPU 110, driver unit 135, CP asset inspector 145, CP ambiance inspector 155, IAM unit 165, or database 175.

The driver unit 135 can include an audio driver 135A and a video driver 135B. The audio driver 135A can include a sound card, a sound driver (not shown), an interactive voice response (IVR) unit, or any other device necessary to render a sound signal on a sound production device (not shown), such as for example, a speaker (not shown). The video driver 135B can include a video card (not shown), a graphics driver (not shown), a video adaptor (not shown), or any other device necessary to render an image signal on a display device (not shown).

The CP asset inspector 145 can be configured to analyze ESI data received from one or more FT devices 20 (shown in FIGS. 1 and 2) or from the database 175. The ESI data can include multidimensional (e.g., two-dimensional or three-dimensional) images of the asset 10 captured by the FT device(s) 20. The ESI data can include, for example, two-dimensional IR, FLIR, or visible spectrum images of a portion or the entire asset 10. The CP asset inspector 145 can include a CNN or deep CNN (DCNN) and an RNN or stacked RNN. The CP asset inspector 145 can include the CNN or RNN combined with an adaptive boosting algorithm to form an ensemble neural network (ENN). The RNN can include, for example, an LSTM, a GRU, a Hopfield network, a bidirectional associative memory (BAM) network, or a continuous time recurrent neural network (CTRNN).

The CP asset inspector 145 can combine application of gas finder detection with thermography-machine learning and predict fracture mechanics and propagation of cracks in nonmetallic assets 10, such as, for example, cracks in oil/gas flowlines in nonmetallic networks by analyzing ESI data originating from the FT devices 20 (shown in FIGS. 1 and 2). The CP asset inspector 145 can include fusion-based analysis to trace anomalous thermal paths in the structure or on the surfaces of the assets 10. The CP asset inspector 145 can detect key features of crack propagation and anomalous surface failures by training ESIs acquired from the FT devices 20 (e.g., OTS cameras or cell phone cameras). The trained machine learning model can distinguish between severely cracked and non-cracked regions in the asset 10.

The CP asset inspector 145 can apply machine learning to the received ESI data to enhance the image data and detect, classify, and monitor patterns that can provide a predictive analysis on the condition of the asset 10, including any aberrations that might exist or develop in the asset 10. The CP asset inspector 145 can detect and predict aberrations that exist or that might develop over time in the asset 10 by, for example, extracting features from the received ESI data for the asset 10 and comparing the extracted features to model or healthy features for the same or similar asset as the asset 10. The extracted features can include, for example, extracted features in IR, FLIR, visible, or hyperspectral regions of the electromagnetic spectrum. The CP asset inspector 145 can detect or predict aberrations in the asset 10, such as, for example, delamination, airgaps, deformations, dents, scratches, cracks, holes, discolorations, or damage that might exist or develop over time in the asset 10.

The CP asset inspector 145 can detect, classify and predict patterns and variations in thermal gradients of the asset 10 by analyzing sequences of ESI frames of the asset 10, which, as noted earlier, can be received from the FT device 20 (shown in FIGS. 1 and 2) or database 175 (shown in FIG. 5). The CP asset inspector 145 can analyze ESI frame data in real-time, where the ESI data is received by the AIA apparatus 100 directly from the FT device 20. Features related to aberrations in the nonmetallic asset 10 can be extracted using a pixel-by-pixel comparative analysis of the ESI frame data, including thermal signature data, for the asset 10 under inspection with known or expected features (reference features), including reference features relating to thermal signatures, from a controlled or clean asset. For instance, the thermal gradient of a damaged asset can be compared to a thermal gradient of non-damaged asset. This allows the AIA apparatus 100 to populate the database 175 with historical data that can be used to train the machine learning framework to detect, identify, assess or predict aberrations that might exist or develop in the asset 10.

The CP asset inspector 145 can be trained using datasets that can train the CNN or RNN, and that might be relevant to the type of asset 10 under inspection, and aberrations that can occur in such or similar assets.

The CP asset inspector 145 can analyze every pixel in the received ESI data and make a prediction at every pixel. The CP asset inspector 145 can receive ESI data for a target area of the asset 10 under inspection, such as, for example, the image captured by the FT device 20 of a section of the asset 10 (e.g., shown in FIGS. 3 and 4). The ESI data can be formatted into $h \times c \times n$ pixel matrix data, where h is the number of rows of pixels in a pixel matrix, c is the number of columns of pixels in the pixel matrix, and n is the number of spectral channels (for example, IR, UV, Red, Green, Blue channels) of pixel data. According to a non-limiting embodiment $h=c=9$ pixels and $n=1$ (IR channel). As noted above, the ESI data can include IR, visible or hyperspectral image data.

After formatting the received ESI data into n matrices of $h \times c$ pixels each, the CP asset inspector 145 can filter (or convolute) each pixel matrix using an $m \times m$ pixel grid filter matrix, where m is equal to or greater than 1, but less than h or c. According to a non-limiting embodiment, $m=2$ pixels. The CP asset inspector 145 can slide and apply one or more $m \times m$ filter matrices (or grids) across all pixels in each $h \times c$ pixel matrix to compute dot products and detect patterns, creating convolved feature matrices having the same size as the $m \times m$ filter matrix. The CP asset inspector 145 can slide and apply multiple filter matrices to each $h \times c$ pixel matrix to extract a plurality of feature maps of the ESI data for the asset 10 under inspection.

Once the feature maps are extracted, the feature maps can be moved to one or more rectified linear unit layers (ReLUs) in the CNN to locate the features. After the features are located, the rectified feature maps can be moved to one or more pooling layers to down-sample and reduce the dimensionality of each feature map. The down-sampled data can be output as multidimensional data arrays, such as, for example, a two-dimensional (2D) array or a three-dimensional (3D) array. The resultant multidimensional data arrays output from the pooling layers can be flattened (or converted) into single continuous linear vectors that can be forwarded to the fully connected layer. The flattened matrices from the pooling layer can be fed as inputs to the fully connected neural network layer, which can auto-encode the feature data and classify the image data. The fully connected layer can include a plurality of hidden layers and an output layer.

The resultant image cells can predict aberrations that might exist in the asset 10, including, for example, on an outer surface, in a wall portion, or an inner surface of the asset 10. Confidence scores can be determined for each image cell that indicate the likelihood that bounding boxes might include an aberration. The CP asset inspector 145 can include bounding box classification, refinement and scoring based on the aberrations in the image represented by the ESI data. The CP asset inspector 145 can determine location data such as, for example, geospatial coordinate data (e.g., latitude, longitude, elevation, or x-y-z Cartesian coordinates) or a location with respect to one or more reference points (not shown) on the asset 10. The location data can be determined for the aberration and the bounding box. Dimension data (height, width, depth, shape) of the aberration and the bounding box, geospatial orientation data (e.g., angular position or attitude) of the aberration and bounding box, and probability data that indicates the likelihood that a given bounding box contains or will develop the aberration can also be determined by the CP asset inspector 145.

In the CP asset inspector 145, the CNN can be a simple CNN having a minimal number of convolutional/pooling layers (e.g., 1 or 2 convolutional/pooling layers) and a single fully connected layer, or it can be a DCNN having many convolutional/pooling layers (e.g., 10, 12, 14, 20, 26, or more layers) followed by multiple fully connected layers (e.g., two or more fully connected layers). And, the RNN ca be a simple single stack RNN or a complex multi-stack RNN. The RNN can include the 3-layer RNN discussed above, in greater detail.

In the CP asset inspector 145, the CNN can be applied to stratify the received image data into abstraction levels according to an image topology, and the RNN can be applied to detect patterns in the images over time. By combining both the CNN and RNN, the CP asset inspector 145 can accomplish both and detect areas of interest and aberrations that might exist or develop over time in the asset 10, as well as capture the creation and evolution of the aberration as it develops over time.

Where the CP asset inspector 145 includes an ENN, such as, for example, the CNN or RNN combined with the boosting algorithm to achieve higher accuracies, the ENN can combine and improve a large number of weak boosting algorithmic learners for added accuracy. Although those skilled in the art might believe that CNNs and RNNs should not be combined with boosting algorithms because the computing time will likely be materially increased, since both CNNs and RNNs require significantly more time to train, and combining an adaptive boosting algorithm like AdaBoost with the CNN and RNN might seem counterproductive as CNNs and RNNs can be trained to be strong learners. For instance, a deep learning CNN can exhibit reliable classification when tested on a larger dataset, providing reliable and effective detection sensitivity and specificity. However, in the technology solution according to the instant disclosure, which can be employed in industries such as for example oil and gas, where mistakes can be extremely costly, increased accuracy at the sacrifice of additional computational time is an acceptable trade-off. Also, boosting can help in selecting the correct architecture and configuring the CNN or RNN.

According to a non-limiting embodiment, the CP asset inspector 145 can be configured to: receive a thermograph captured from the asset 10 using an FT device having an infrared radiation sensor and additional data related to the asset and environmental conditions; apply one or more filters to the thermograph and the additional data using a first machine learning system; initially determine an aberration classification (e.g., hole, delamination, crack, deformation) based on output from the one or more filters; validate the initial aberration classification by an inspection of the asset 10; train the filters of the first machine learning system based on results of the validation; and repeat each of the foregoing with additional thermograph data until a first threshold for aberration classification accuracy is reached. The first machine learning system comprises one of a CNN, an RNN, or an ENN. The outputs of the first machine learning system and additional data related to the asset 10 and environment conditions can then be input into a second machine learning system that incorporates information from earlier states into current states and used to train the second machine learning system to identify aberrations according to changes in the outputs of the first machine learning system and the additional data over time until a second threshold for aberration classification accuracy is reached. After the first and second thresholds are reached, the CP asset inspector 145 can identify the aberration in the asset 10 based on current thermograph and additional data using the first and second machine learning systems in coordination. The second machine learning system comprises a CNN, an RNN, or an ENN, but the second machine learning system is different from the first machine learning system. The CNN includes a plurality of hierarchical layers, each hierarchical layer including a convolutional stage, a non-linear function stage and a pooling stage. The additional data includes ambient temperature, physical characteristics of the structure and weather conditions measured over time. The first and second machine learning systems can be trained to recognize false positive findings relative to reflection of infrared radiation from objects external from the asset 10. The CP asset inspector 145 can process the thermograph data and the additional data to encode categorical variables and normalize continuous variables.

As noted earlier, the CP ambiance inspector 155 can be provided as a separate device or module, as shown in FIG. 5, or it can be integrated with the CP asset inspector 145 as a single device or module. The CP ambiance inspector 155 can be integrated with the CP asset inspector 145 by, for example, configuring the CP asset inspector 145 to analyze gas profile data included in the ESI data. Alternatively, the CP asset inspector 145 can be configured to carry out the functions of the CP ambiance inspector 155. In an alternative embodiment, the CP ambiance inspector 155 can be left out.

The CP ambiance inspector 155 can be configured to analyze a gas profile in the ESI or gas sensor data received from the FT device 20 (shown in FIGS. 1 and 2) or from the database 175 (shown in FIG. 5). The gas profile can be analyzed based on, for example, IR image data or hyperspectral image data that depicts the gas and its characteristics; or, the gas profile can be analyzed based on, for example, electrochemical sensor data, catalytic bead sensor data, or any other sensor data that can provide an accurate and comprehensive profile of one or more gasses that might leak from or be emitted by the asset 10, including a gas such as, for example, methane, propane, butane, ethane, hydrogen sulfide, chlorine, or any other gas that might be contained in the asset 10 or be emitted by the structure of the asset 10 as a result of, for example, a chemical reaction. The gas can be a gas that is not typically found in the environment surrounding the asset 10.

Gas emissions from the nonmetallic asset 10 can have different electromagnetic spectrum (e.g., temperature) or molecular signatures from the gases that can exist in the user environment UE (shown in FIG. 1) surrounding the asset 10. Applying machine learning, the CP ambiance inspector 155 can detect or predict a gas that might be emitted from or by the asset 10. Relatedly, the CP ambiance inspector 155 can detect, classify, monitor or predict the gas profile for the gas that might leak from or be emitted by the asset 10. A gas profile can include, for example, the concentration of the gas proximate to the asset 10, the flow vector of the gas with respect to the asset 10, the temperature of the gas, the pressure of the gas, or other characteristics of the gas emitted from or by the asset 10. The concentration can be represented in moles-per-cubic centimeter of the gas; the temperature in Celsius, and the pressure in Newtons. The flow vector of the gas can include, as a function of time, the direction of movement of gas molecules, the velocity of the gas, the change in direction, or the change in velocity (or acceleration) of the gas.

The CP ambiance inspector 155 can include a machine learning framework similar to that of the CP asset inspector 145. The CP ambiance inspector 155 can include both the CNN or DCNN and the RNN or stacked RNN. Similarly, the CP ambiance inspector 155 can include the adaptive boosting algorithm combined with the CNN or RNN. The CP ambiance inspector 155 can analyze ESI data or gas sensor data and apply machine learning to detect, identify, assess or predict a gas that might be emitted from or by the asset 10. The CP ambiance inspector 155 can apply machine learning to determine a gas profile and detect and classify patterns that can provide a predictive analysis on the condition of aberrations in the nonmetallic asset 10. The gas profile can be formed from the ESI data based on, for example, h×c×n matrix data, where h is the number of rows of data points in the matrix, c is the number of columns of data points in the matrix, and n is the number of spectral channels (for example, IR or FLIR channels) of pixel data. The gas profile data can be processed in a manner similar to that described above with respect to the CP asset inspector 145 to detect, classify and predict gas emissions from the asset 10 under inspection, including, for example, location of the emission on the asset 10, concentration (e.g., moles/cm$^3$ of gas molecules as function of time), flow vector (e.g., direction, change direction, velocity, and change in velocity as function of time), identification of gas, and any other characteristics of the gas that might facilitate aberration detection, classification or prediction for the asset 10 under inspection.

The IAM unit 165 can be configured to interact with the CP asset inspector 145 or CP ambiance inspector 155. The IAM unit 165 can include a machine learning framework, such as, for example, a neural network (NN), an artificial neural network (ANN), a deep neural network (DNN), an RNN, a stacked RNN, a CNN, a DCNN, a deep belief neural network (DBN), a support-vector machine (SVM), a Boltzmann machine, a decision tree, a Gabor filter, or any other supervised learning technology. The IAM unit 165 can interact with the CP asset inspector 145 or CP ambiance inspector 155 and receive aberration determination information for the asset 10. The aberration determination information can include an identification of the aberration and its location, shape, and size. The identification can include, for example, an indication that the aberration is a delamination, airgap, deformation, crack, hole, or damaged area. The aberration determination information can also include an identification of the asset 10 under inspection, as well as its location, shape, and size. The aberration determination information can include a prediction score that indicates the likelihood that the aberration exists or will develop over time in the asset. The prediction score can range from, for example, 0% to 100%, with 100% being a detected aberration, and 0% to 99.99% being a prediction that an aberration exists or will develop in a highlighted area on the asset 10.

Based on the aberration determination information, the IAM unit 165 can generate an aberration assessment, which an include a report and/or an aberration model. The aberration assessment report can include a high-resolution image or sequence of image frames (e.g., video) of the detected aberration and asset. The aberration model can include an augmented reality image or sequence of image frames (e.g., video) that includes an image of the asset and an image of the predicted aberration superimposed or combined with the image of the asset. In the sequence of image frames, the image of the asset can be combined with a machine generated (virtual reality) image of the aberration, showing the formation or development of the aberration over time from its creation through its various stages of development, such as, for example, crack formation to propagation of the crack over time.

The IAM unit 165 can initiate communication and transmit the aberration assessment to the communicating device 50 (shown in FIG. 1) via, for example, the network interface 125 or I/O interface 130 (shown in FIG. 5). The aberration assessment can include, for example, image rendering data and instruction signals to display the image of the asset 10 (or a portion thereof) with the aberration. The image can be rendered on a display (not shown) of the communicating device 50 as a video (e.g., a sequence of image frames). The aberration assessment can include image rendering data and instruction signals to render a gas profile image, for example, of the gas that might be emitted from or by the asset 10 under inspection. The aberration or predicted aberration can be displayed in the image of the asset 10 and highlight the area where the aberration has occurred or is predicted to occur. The displayed image can also include the gas profile image, which can include a predicted gas profile image.

The aberration determination information received from the CP asset inspector 145 or CP ambiance inspector 155 can be used by the IAM unit 165 to determine a thickness of a portion of interest of the asset 10, such as, for example, a wall thickness of a portion a nonmetallic pipe. Based on the aberration determination information, the IAM unit 165 can determine an integrity of the asset 10, including, for example, a joint located between metallic and nonmetallic materials. The nonmetallic material can include, for example, a thermoplastic composite pipe (TCP), a reinforced thermoplastic pipe (TRP), a glass reinforced epoxy (GRE), a glass fiber thermosetting resin (RTR), or any other nonmetallic material that can be joined with a metal material, whether through use of an adhesive or a mechanic fastener. This can be particularly useful in the petroleum industry where RTP/TCP materials are commonly joined to metal joints, since a majority of failures tend to occur at the joints in such applications.

The IAM unit 165 can determine the state of bonding between similar assets 10, such as, for example, between similar pipes. In petroleum industry applications, the IAM unit 165 can receive aberration determination information relating to RTR/GRE pipes where connections can include RTR to RTR or GRE to GRE, since failures tend to occur at such joints.

The aberration determination information can include information about aberrations in external surfaces of the nonmetallic assets 10. This can be particularly useful in applications where incidents and failures can occur from external damage to the asset 10.

The aberration determination information can include information about repair work that might have been made to an asset 10, such as, for example, a sleeve or wrapping that might have been applied to a nonmetallic pipe. In petroleum industry applications, RTR/GRE piping systems can be inspected and monitored after repair to ensure and verify proper bonding and integrity.

The database 175 can receive and store large amounts of ESI data, gas sensor data, metadata, and historical data. The ESI or gas sensor data can include gas profile data. The database 175 can store full-view (or 360°) ESI data for the asset 10, as well as each asset in a network of assets (shown in FIG. 2). The database 175 can store extracted feature data for previously extracted features in ESI data or gas sensor data. The database 175 can store, for example, terabytes, petabytes, exabytes, zettabytes, yottabytes, or larger amounts of data. The database 175 can receive and store aberration determination information from the CP asset inspector 145 or CP ambiance inspector 155. The database 175 can store historical data for each asset 10, including ESI data, gas sensor data, gas profile data, aberration determination information, and metadata. The historical data can span over a period of, for example, minutes, hours, days, weeks, months, or years.

The database 175 can include a database management system (DBMS) (not shown), file-based storage system or any storage medium which can receive and process queries in the AIA apparatus 100 to locate and retrieve data from the database 175. The database 175 can include a DBMS such as, for example, SQL, MySQL, Oracle, Access, or Unix. The database 175 can include a relational database.

Figure 6:
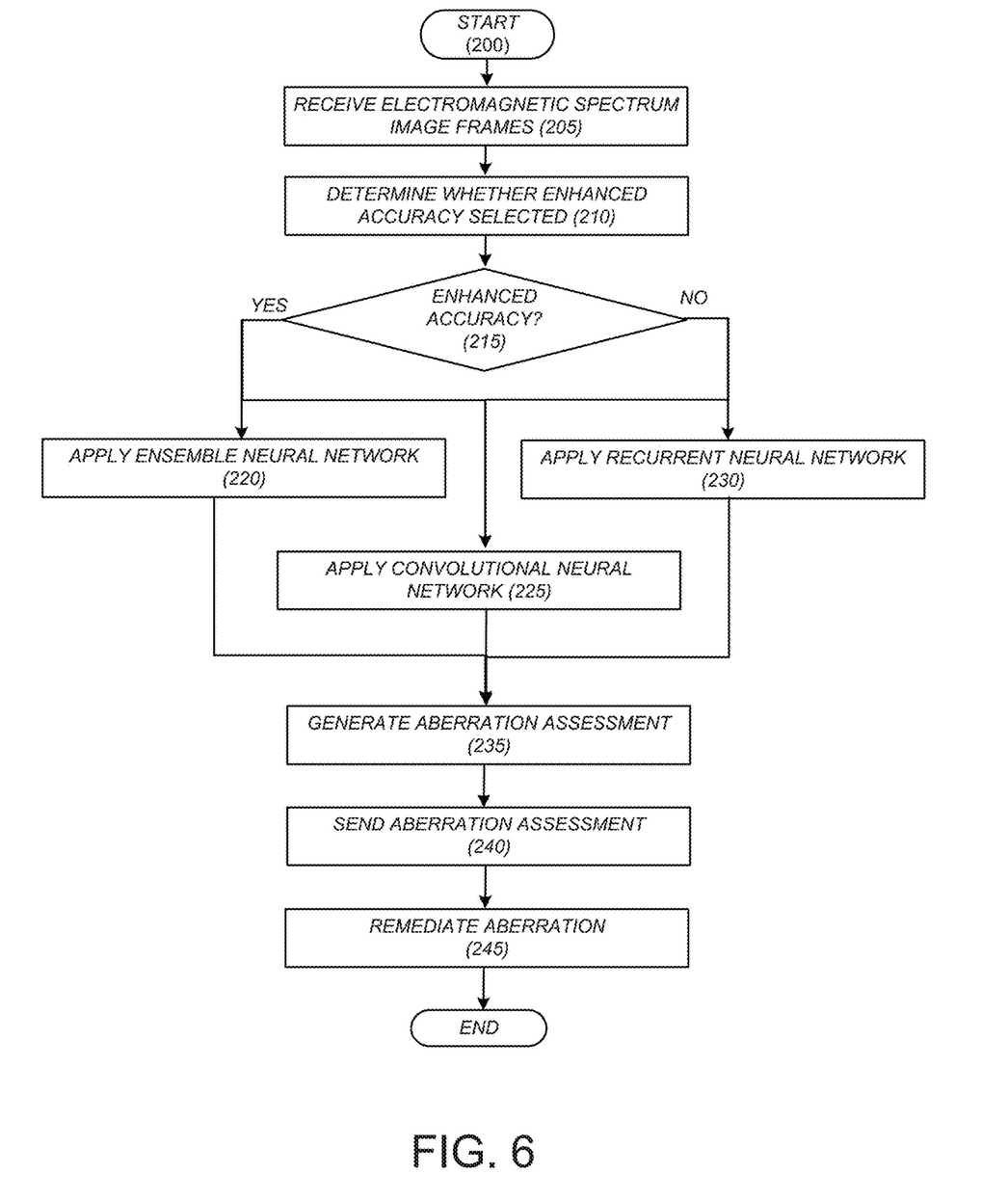
FIG. 6 shows an example of an aberration determination process, according to the principles of the disclosure.

FIG. 6 shows an example of an aberration determination process 200, according to the principles of the disclosure. The process 200 can be carried by the AIA apparatus 100 (shown in FIG. 6). However, before the process 200 begins, ESIs (electromagnetic spectrum images) of an area of interest for the asset 10 under inspection should be captured by the FT device 20 (shown in FIGS. 1 and 2). The ESI data received from the FT device 20 can include data that the AIA apparatus 100 can use to build synthetic ESI (e.g., thermal) image data structures and supplement a training set for a predictive machine learning model like the CNN and RNN. The ESI data can include, in addition to the ESI images, environmental variables such as, for example, temperature, humidity, precipitation, pressure, time of day, sun exposure, and asset parameters, such as, for example, dimensions, position, material, and asset type. The ESI images can include a set of thermal images of the asset 10, or various other assets captured in the field ("field thermographs"). The environmental variables and asset parameters can be input into the AIA apparatus 100, which can, in the case of thermal images, apply a thermal dynamics model having known thermodynamic properties of materials based on environmental conditions to generate a synthetic temperature map of the asset over time, which can be based on a random probability distribution of temperature and humidity conditions. The synthetic temperature map and the field thermographs can also be input to the AIA apparatus 100 and an imaging model applied to create images from the temperature map. The field thermographs can be used as a basis of calibration and comparison. As an example, if the temperature map of the asset exhibits a tendency toward greater temperature contrasts than shown in field thermographs of similar assets under similar conditions, the AIA apparatus 100 can make weighting adjustments to bring the temperature map closer to the field thermographs. After such adjustments are made, the AIA apparatus 100 can generate synthetic thermal images that can be displayed to predict aberrations, and can also be used to supplement field thermographs during training.

Referring to FIGS. 1, 3, and 4, the FT device 20 can be positioned near the asset 10 so that the field of view 25 of the FT device 20 is focused on the area of interest on the asset. In a non-limiting example, an IR camera or a standard commercial industrial thermographic FUR camera can be used for the FT device 20. The FT device 20 can capture an image of the area of interest, such as a sequence of still image frames or a sequence of image frames captured at a frame rate of, for example, 0.1 frames/second, 0.5 frames/second, 24 frames/second, 30 frames/second, 60 frames/second, or any other frame rate appropriate for the particular asset 10 under inspection, including the operating conditions in and near the asset 10, user environment or any other factors that can be useful in the analysis, detection, identification, assessment or prediction of aberrations that could exist or develop over time in the area of interest of the asset 10. The captured images can include electromagnetic spectrum images (ESI) that display the thermal gradient (or thermal behavior) of the asset 10. The captured images can cover an exposure time period ranging from, for example, about 10 minutes to about 30 minutes at a frame rate of 0.5 frames/second (i.e., 1 frame every 2 seconds). The ESIs can display thermal gradients resulting from, for example, fluctuations in temperature caused by changes in pressure or flow of a liquid in the asset 10. The ESIs can be transmitted by the FT device 20 to the AIA apparatus 100 (e.g., via the communication link 22) and stored in the database 175 as ESI data sets to be used as input to the machine learning framework to analyze the images over time. The ESI data can be stored in the database 175 as raw image data.

In a nonlimiting example, the area of interest can be the section of the RTR pipe 10 shown in FIGS. 3 and 4, including the created aberration in portion 12. The ESI data can include IR images of the pipe 10, including the portion 12. The ESI data can include the thermal gradient image of the pipe 10, including portion 12 shown in FIG. 4. The output of the AIA apparatus 100 is capable of accurately detecting the manufactured defect 12 and predicting the aberration 16 that will develop in the RTR pipe 10 over time. Since the defects in this example can be verified, a ground truth analysis can be possible and matched to the predicted damage profile. As seen in the aberration prediction image shown in FIG. 4, the AIA apparatus 100 can detect and predict abnormal heat transfer rate patterns on the inner pipe surface.

If equipped with a gas sensor (not shown), the FT device 20 can also transmit gas sensor data to the AIA apparatus 100, which can be stored with the ESI data in the database 175. If so equipped, any reference to "ESI data" in the process 200 (shown in FIG. 6) means "ESI data and, optionally, gas sensor data."

The ESI data can be analyzed by the AIA apparatus 100 (shown in FIG. 5) to detect the aberration in portion 12 of the RTR pipe in the field of view 25 and predict the aberration 16 that will develop over time in the RTR pipe 10 (shown in FIG. 4). The AIA apparatus 100 can receive ESI data from the database 175 or directly from the FT device 20 (Step 205). A determination can be made whether enhanced accuracy is to be applied for assessing or predicting an aberration at the expense of additional computing time (Step 210). If it is determined that enhanced accuracy is to be applied (YES at Step 215), then the ESI data can be sent to an ensemble neural network such as an RNN combined with AdaBoost (Step 220) and the CNN (Step 225). The Ada-Boost adaptive boosting algorithm can work in conjunction with the RNN to address issues such as, for example, decay of information that can occur when applying the RNN to the ESI data. The ENN can be applied to the ESI data to analyze patterns in sequences of ESI frames to detect, identify and predict the creation and development of the aberration (e.g., portion 12 in FIGS. 3 and 4) over time (Step 220). The neural networks can detect, identify and prediction the existence and the location of the aberration (Step 225).

However, if it is determined that enhanced accuracy is not to be applied (NO at Step 215), then the ESI data can be sent to the CNN (Step 230) and the RNN (Step 225). Unlike the ENN, the CNN does not include an adaptive boosting algorithm like AdaBoost that works in conjunction with the RNN. Applying the RNN (Step 230) without adaptive boosting can result in, for example, increased effects of information decay with the benefit of decreased computing time.

After the ESI data is analyzed by the CNN (Step 225) together with either the RNN (Step 230) or ENN (i.e., the RNN working in conjunction with AdaBoost) (Step 220), aberration determination information can be forwarded to the IAM unit 165, where an aberration determination report or aberration model can be generated (Step 235). The aberration determination report or model can be sent to the communicating device 50 (shown in FIG. 1) (Step 240), where the image of the asset 10 can be displayed with the aberration (e.g., portion 12, shown in FIGS. 3 and 4) and predicted aberration (e.g., portion 16, shown in FIGS. 3 and 4). The aberration information, including location, can be used to remediate the aberration on the asset 10 (Step 245), such as, for example, by dispatching a robot or a team to the field to repair or replace the asset 10. Alternatively, the aberration report or model can be rendered locally at the AIA apparatus 100, such as, for example, a display device (not shown).

It is noted that prior to initiating the process 200, the CNN and RNN should be trained using known and controlled data such as, for example, thermal gradients from nonmetallic pipes with known defects and clean nonmetallic pipes with no defects. To enhance the accuracy of the neural networks, synthetic data can be generated for training purposes, including image with known superimposed thermal defects at different angles and orientations. Since the accuracy of the neural networks can depend on the amount of data in the training sets, the database 175 can be populated with large amounts of historical data, including training datasets for all known or anticipated aberrations that have occurred or might occur in the nonmetallic assets 10.

The terms "a," "an," and "the," as used in this disclosure, means "one or more," unless expressly specified otherwise.

The term "aberration," as used in this disclosure, means an abnormality, an anomaly, a deformity, a malformation, a defect, a fault, a delamination, an airgap, a dent, a scratch, a cracks, a hole, a discolorations, or an otherwise damaged portion or area of an asset that could have a negative or undesirable effect on the performance, durability, or longevity of the asset 10.

The term "backbone," as used in this disclosure, means a transmission medium that interconnects one or more computing devices or communicating devices to provide a path that conveys data signals and instruction signals between the one or more computing devices or communicating devices. The backbone can include a bus or a network. The backbone can include an ethernet TCP/IP. The backbone can include a distributed backbone, a collapsed backbone, a parallel backbone or a serial backbone.

The term "communicating device," as used in this disclosure, means any hardware, firmware, or software that can transmit or receive data packets, instruction signals, data signals or radio frequency signals over a communication link. The communicating device can include a computer or a server. The communicating device can be portable or stationary.

The term "communication link," as used in this disclosure, means a wired or wireless medium that conveys data or information between at least two points. The wired or wireless medium can include, for example, a metallic conductor link, a radio frequency (RF) communication link, an Infrared (IR) communication link, or an optical communication link. The RF communication link can include, for example, WiFi, WiMAX, IEEE 802.11, DECT, 0G, 1G, 2G, 3G, 4G, or 5G cellular standards, or Bluetooth. A communication link can include, for example, an RS-232, RS-422, RS-485, or any other suitable serial interface.

The terms "computer" or "computing device," as used in this disclosure, means any machine, device, circuit, component, or module, or any system of machines, devices, circuits, components, or modules which are capable of manipulating data according to one or more instructions, such as, for example, without limitation, a processor, a microprocessor, a graphics processing unit, a central processing unit, a general purpose computer, a super computer, a personal computer, a laptop computer, a palmtop computer, a notebook computer, a desktop computer, a workstation computer, a server, a server farm, a computer cloud, or an array of processors, microprocessors, central processing units, general purpose computers, super computers, personal computers, laptop computers, palmtop computers, notebook computers, desktop computers, workstation computers, or servers.

The term "computer-readable medium," as used in this disclosure, means any storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read. The computer-readable medium can include a "Cloud," which includes a distribution of files across multiple (for example, thousands of) memory caches on multiple (for example, thousands of) computers.

Various forms of computer readable media can be involved in carrying sequences of instructions to a computer. For example, sequences of instruction (i) can be delivered from a RAM to a processor, (ii) can be carried over a wireless transmission medium, or (iii) can be formatted according to numerous formats, standards or protocols, including, for example, WiFi, WiMAX, IEEE 802.11, DECT, 0G, 1G, 2G, 3G, 4G, or 5G cellular standards, or Bluetooth.

The term "database," as used in this disclosure, means any combination of software or hardware, including at least one application or at least one computer. The database can include a structured collection of records or data organized according to a database model, such as, for example, but not limited to at least one of a relational model, a hierarchical model, or a network model. The database can include a database management system application (DBMS) as is known in the art. The at least one application may include, but is not limited to, for example, an application program that can accept connections to service requests from clients by sending back responses to the clients. The database can be configured to run the at least one application, often under heavy workloads, unattended, for extended periods of time with minimal human direction.

The terms "including," "comprising" and their variations, as used in this disclosure, mean "including, but not limited to," unless expressly specified otherwise.

The term "network" or "subnetwork," as used in this disclosure means, but is not limited to, for example, at least one of a local area network (LAN), a wide area network (WAN), a metropolitan area network (MAN), a personal area network (PAN), a campus area network, a corporate area network, a global area network (GAN), a broadband area network (BAN), a cellular network, a cloud network, or the Internet, any of which can be configured to communicate data via a wireless or a wired communication medium. These networks can run a variety of protocols not limited to TCP/IP, IRC or HTTP.

The term "server," as used in this disclosure, means any combination of software or hardware, including at least one application or at least one computer to perform services for connected clients as part of a client-server architecture, server-server architecture or client-client architecture. A server can include a mainframe or a server cloud or server farm. The at least one server application can include, but is not limited to, for example, an application program that can accept connections to service requests from clients by sending back responses to the clients. The server can be configured to run the at least one application, often under heavy workloads, unattended, for extended periods of time with minimal human direction. The server can include a plurality of computers configured, with the at least one application being divided among the computers depending upon the workload. For example, under light loading, the at least one application can run on a single computer. However, under heavy loading, multiple computers can be required to run the at least one application. The server, or any if its computers, can also be used as a workstation.

The term "transmission" or "transmit," as used in this disclosure, means the conveyance of data, data packets, computer instructions, or any other digital or analog information via electricity, acoustic waves, light waves or other electromagnetic emissions, such as those generated with communications in the radio frequency (RF) or infrared (IR) spectra. Transmission media for such transmissions can include coaxial cables, copper wire and fiber optics, including the wires that comprise a system bus coupled to the processor.

Devices that are in communication with each other need not be in continuous communication with each other unless expressly specified otherwise. In addition, devices that are in communication with each other may communicate directly or indirectly through one or more intermediaries.

Although process steps, method steps, or algorithms may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described in this specification may be performed in any order practical.

When a single device or article is described, it will be readily apparent that more than one device or article may be used in place of a single device or article. Similarly, where more than one device or article is described, it will be readily apparent that a single device or article may be used in place of the more than one device or article. The functionality or the features of a device may be alternatively embodied by one or more other devices which are not explicitly described as having such functionality or features.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A computer-implemented method for analyzing a sequence of electromagnetic spectrum image frames of a nonmetallic asset and detecting or predicting an aberration in the asset, including a detected or predicted location of the aberration, the method comprising:
receiving the electromagnetic spectrum image frames by a pair of machine learning systems of different types;
applying a convolutional neural network (CNN) to the electromagnetic spectrum image frames to stratify the electromagnetic spectrum images into abstraction levels according to an image topology and output first aberration determination information;
applying a recurrent neural network (RNN) to the electromagnetic spectrum image frames to detect patterns in electromagnetic spectrum images over time and output second aberration determination information;
generating an aberration assessment based on the first and second aberration determination information;
transmitting the aberration assessment to a communicating device;
receiving gas profile data indicative of a gas emitted from or by the asset using the electromagnetic spectrum image frames; and
predicting the gas profile for the gas that might leak from or be emitted by the asset,
wherein the aberration assessment includes prediction of an aberration and a location of the aberration in or on the nonmetallic asset.

2. The method in claim 1, wherein the electromagnetic spectrum image frames comprise thermographs.

3. The method in claim 1, wherein the pair of machine learning systems of different types include a convolutional neural network (CNN) and an ensemble neural network (ENN).

4. The method in claim 3, wherein the ensemble neural network (ENN) comprises a recurrent neural network (RNN) combined with an adaptive boosting algorithm.

5. The method in claim 4, wherein the adaptive boosting algorithm comprises AdaBoost.

6. The method in claim 1, wherein the first aberration determination information is output from the CNN to the RNN or vice versa.

7. The method in claim 1, wherein the convolutional neural network includes a plurality of hierarchical layers, each hierarchical layer including a convolutional stage, a non-linear function stage and a pooling stage.

8. The method in claim 1, wherein the aberration assessment comprises an augmented reality image of the aberration superimposed with a visible image of the nonmetallic asset.

9. The method in claim 1, wherein the aberration assessment comprises an image of the aberration with an image of the nonmetallic asset.

10. An inspection and monitoring system for analyzing a sequence of electromagnetic spectrum image frames of a nonmetallic asset and detecting or predicting an aberration in the asset, including a detected or predicted location of the aberration, the system comprising:
    a first machine learning system configured to receive the electromagnetic spectrum image frames and apply a convolutional neural network (CNN) to the electromagnetic spectrum image frames to stratify the electromagnetic spectrum image frames into abstraction levels according to an image topology and output first aberration determination information;
    a second machine learning system configured to apply one of a recurrent neural network (RNN) to the electromagnetic spectrum image frames to detect patterns in electromagnetic spectrum images over time and output second aberration determination information;
    an inspection and monitoring unit configured to generate an aberration assessment based on the first and second aberration determination information and transmit the aberration assessment to a communicating device; and
    a cyber-physical ambiance inspector that receives gas profile data indicative of a gas emitted from or by the asset, wherein the cyber-physical ambiance inspector is configured to predict the gas profile for the gas that might leak from or be emitted by the asset.

11. The inspection and monitoring system in claim 10, wherein the electromagnetic spectrum image frames comprise thermographs.

12. The inspection and monitoring system in claim 10, wherein the first machine learning system comprises a convolutional neural network (CNN) and the second machine learning system comprises an ensemble neural network (ENN).

13. The inspection and monitoring system in claim 12, wherein the ensemble neural network (ENN) comprises a recurrent neural network (RNN) combined with an adaptive boosting algorithm.

14. The inspection and monitoring system in claim 10, wherein the first aberration determination information is output from the CNN to the RNN or vice versa.

15. The inspection and monitoring system in claim 10, wherein the convolutional neural network includes a plurality of hierarchical layers, each hierarchical layer including a convolutional stage, a non-linear function stage and a pooling stage.

16. The inspection and monitoring system in claim 10, wherein the aberration assessment comprises an augmented reality image of the aberration superimposed with a visible image of the nonmetallic asset.

17. The inspection and monitoring system in claim 10, wherein the aberration assessment comprises an image of the aberration with an image of the nonmetallic asset.

18. A non-transitory computer readable storage medium storing inspection and monitoring program instructions for causing a computing device to analyze a sequence of electromagnetic spectrum image frames of a nonmetallic asset and detect or predict an aberration in the asset, including a detected or predicted location of the aberration, the program instructions comprising the steps of:
    receiving the electromagnetic spectrum image frames by a pair of machine learning systems of different types;
    applying a convolutional neural network (CNN) to the electromagnetic spectrum image frames to stratify the electromagnetic spectrum images into abstraction levels according to an image topology and output first aberration determination information;
    applying a recurrent neural network (RNN) to the electromagnetic spectrum image frames to detect patterns in electromagnetic spectrum images over time and output second aberration determination information;
    generating an aberration assessment based on the first and second aberration determination information;
    transmitting the aberration assessment to a communicating device;
    receiving gas profile data indicative of a gas emitted from or by the asset using the electromagnetic spectrum image frames; and
    predicting the gas profile for the gas that might leak from or be emitted by the asset; wherein the aberration assessment includes prediction of an aberration and a location of the aberration in or on the nonmetallic asset.

19. The non-transitory computer readable medium in claim 18, the program instructions further comprising the step of analyzing gas profile data indicative of a gas emitted from or by the asset.

20. The non-transitory computer readable medium in claim 18, wherein the electromagnetic spectrum image frames comprise thermographs.

* * * * *